United States Patent [19]
Emmett et al.

[11] Patent Number: 4,829,326
[45] Date of Patent: May 9, 1989

[54] REGISTRATION SYSTEM FOR AN ELECTROSTIC PRINTER/PLOTTER

[75] Inventors: David M. Emmett, Palo Alto; John H. Hughes, San Jose; Alan Zimmerman, Saratoga, all of Calif.

[73] Assignee: Brenson, Inc., San Jose, Calif.

[21] Appl. No.: 93,126

[22] Filed: Sep. 3, 1987

Related U.S. Application Data

[63] Continuation of Ser. No. 794,870, Nov. 4, 1985, abandoned.

[51] Int. Cl.$^4$ ............................................. G01D 15/00
[52] U.S. Cl. .................................... 346/157; 346/153.1
[58] Field of Search ...................... 346/157, 70, 153.1; 358/78, 300; 355/3 SH, 14 SH, 14 R; 400/114, 107; 101/DIG. 13

[56] References Cited

U.S. PATENT DOCUMENTS

| | | | |
|---|---|---|---|
| 4,007,489 | 2/1977 | Helmberger et al. | 358/78 |
| 4,569,584 | 2/1986 | St. John et al. | 346/157 |

Primary Examiner—Arthur G. Evans
Attorney, Agent, or Firm—Townsend & Townsend

[57] ABSTRACT

A system for registering the primary colored images formed by a full color electrostatic plotter to create a high resolution composite color image. The print heads in the system include an active region of styli for forming image lines and left and right slack regions of styli. The active region may be shifted from side and increased in size to assure lateral registration. Longitudinal registration is achieved by adjusting the time interval between printing lines of successive primary images. Specific embodiments utilize line enhancement algorithms to ensure minimize line thickness in the image and to avoid the creation of artifacts in complex regions of the image and CCDs as sensors.

14 Claims, 6 Drawing Sheets

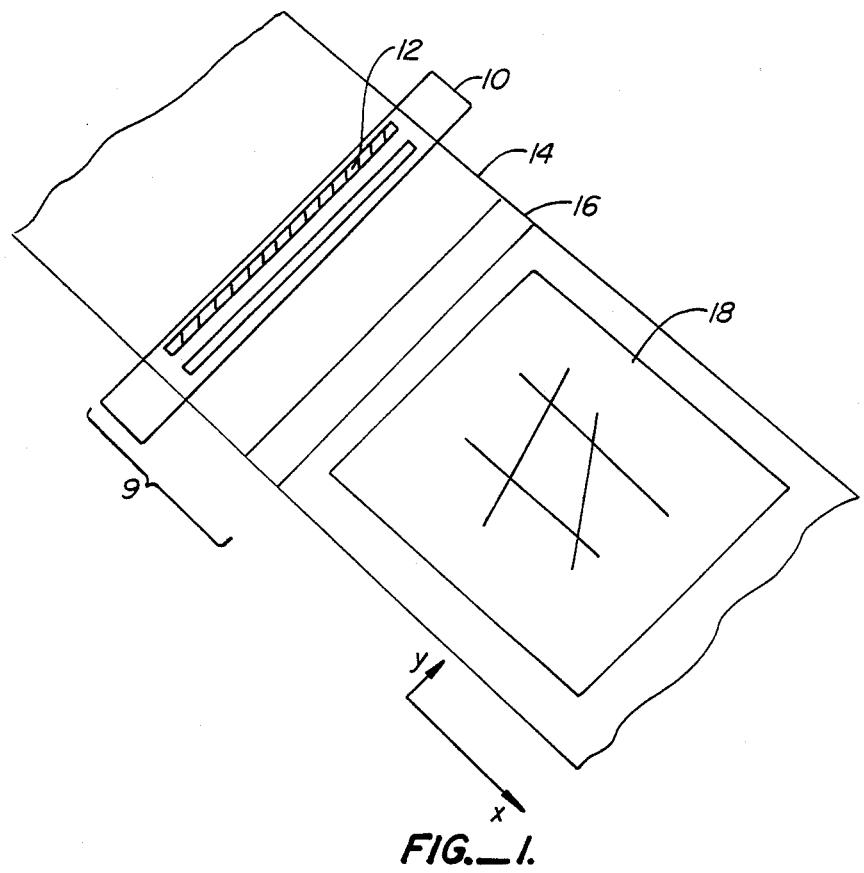
FIG._1.
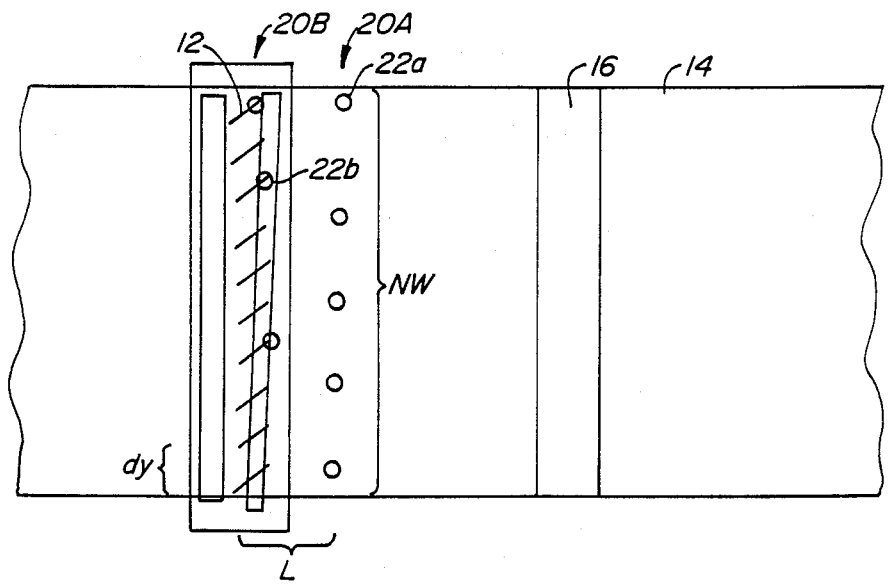
FIG._2.

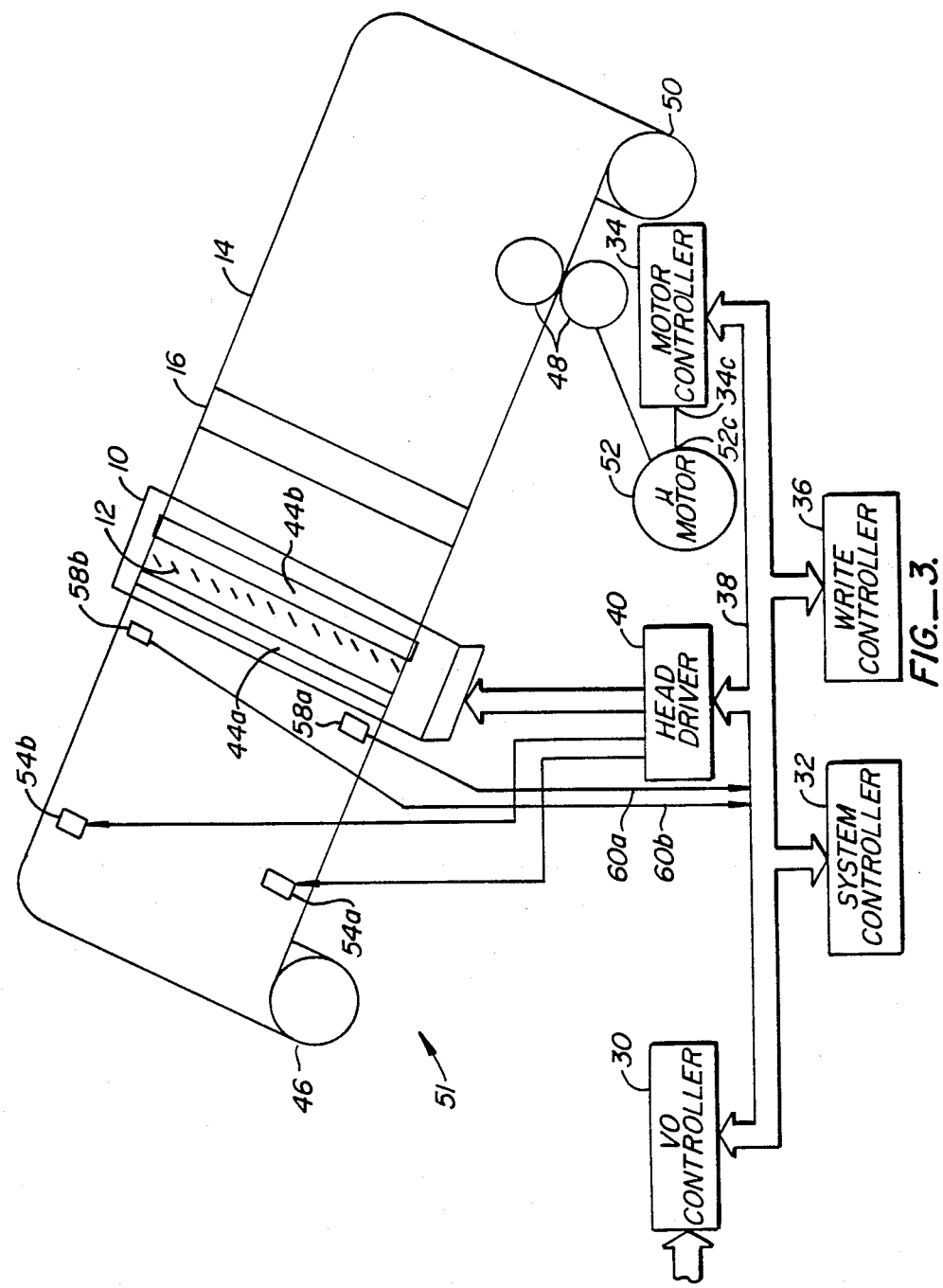
FIG._3.

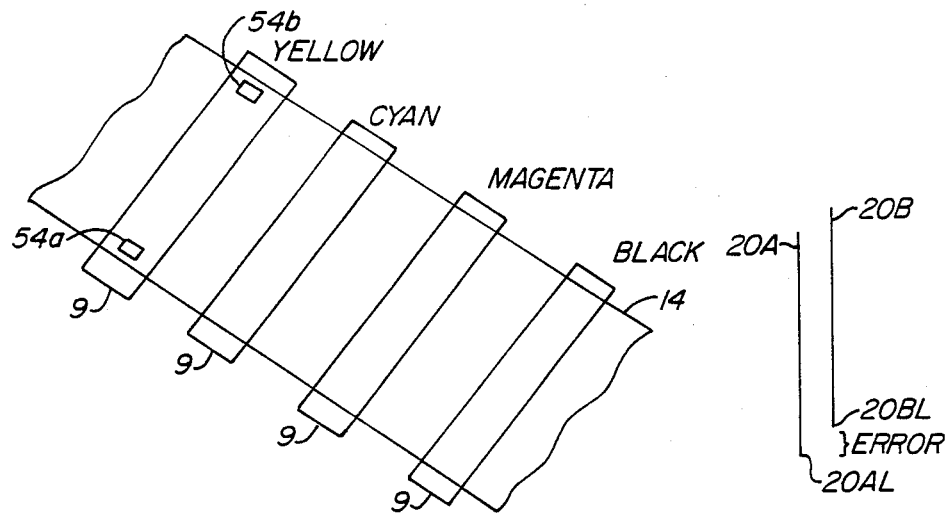
FIG._4.
FIG._5.
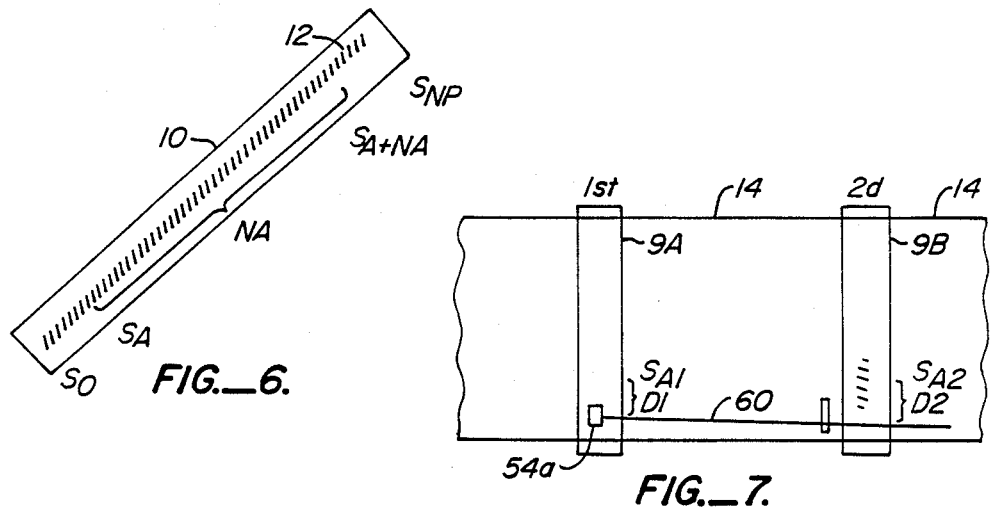
FIG._6.
FIG._7.
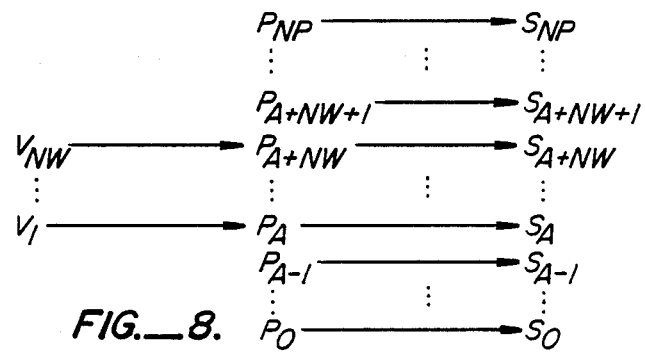
FIG._8.

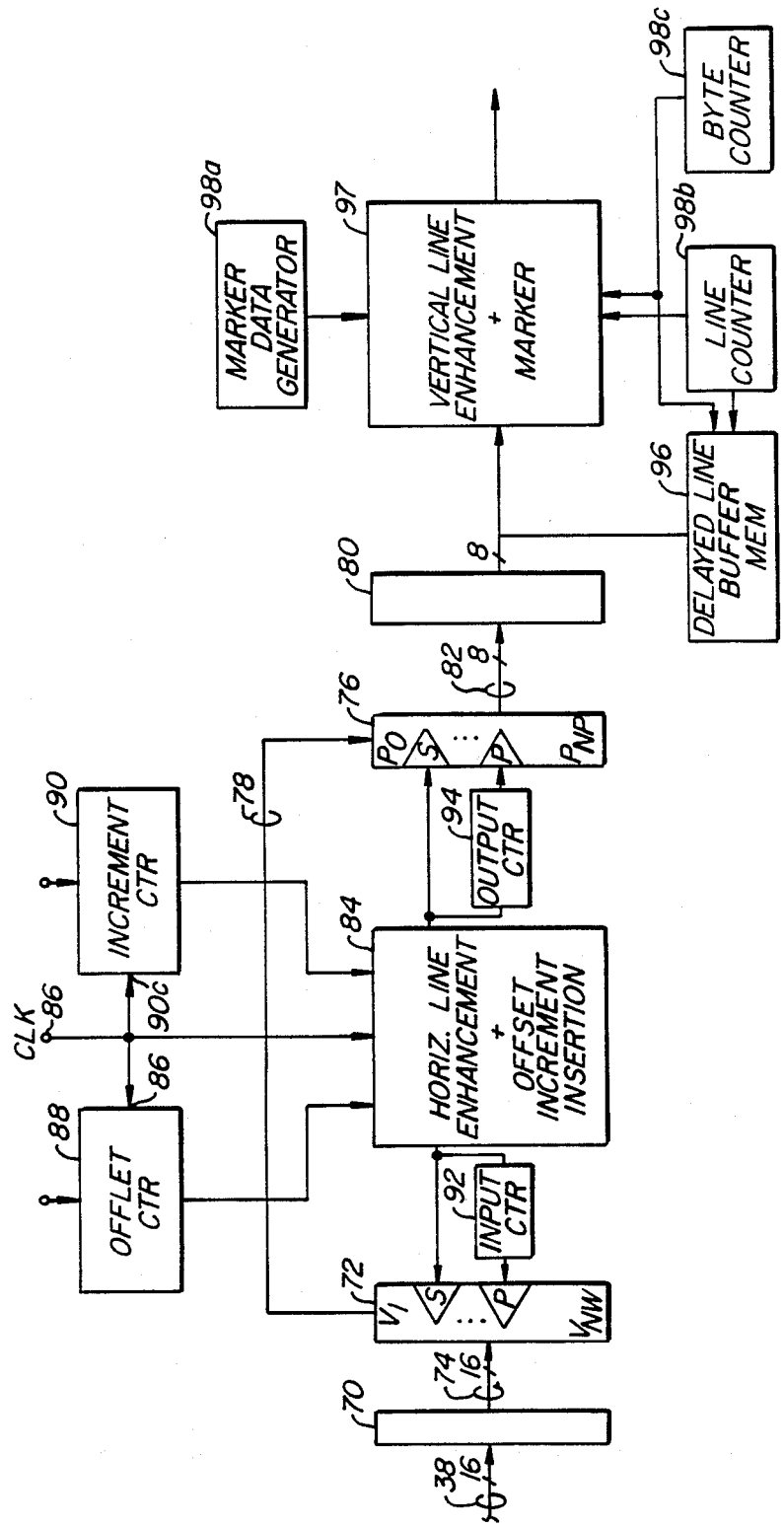
FIG._9.

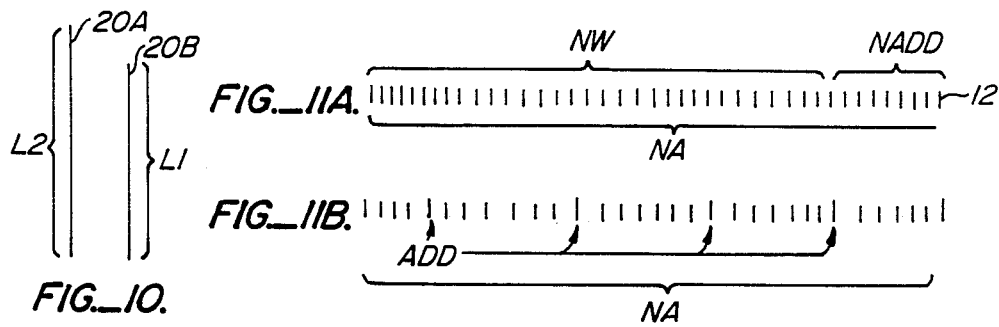
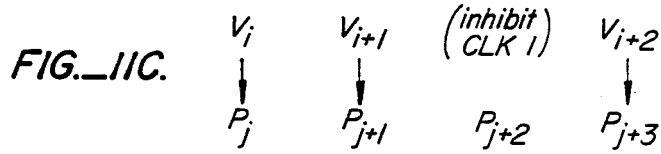
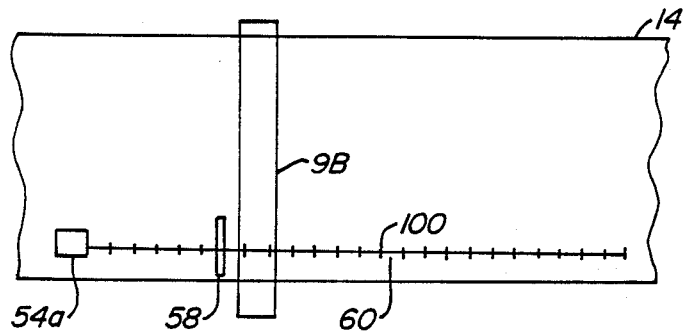
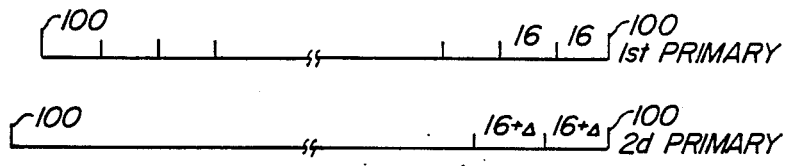
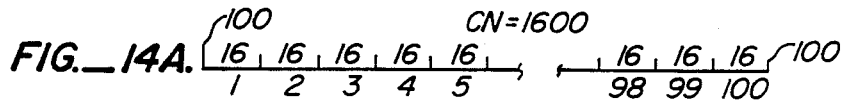
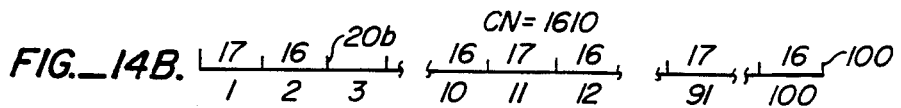

FIG._15A.
```
  M Y W M
  Y W M Y
  W M Y W
```
FIG._15B.
```
        M
  M Y W Y
  Y W M Z
  W M Y W
  M Y W M
```
FIG._15.
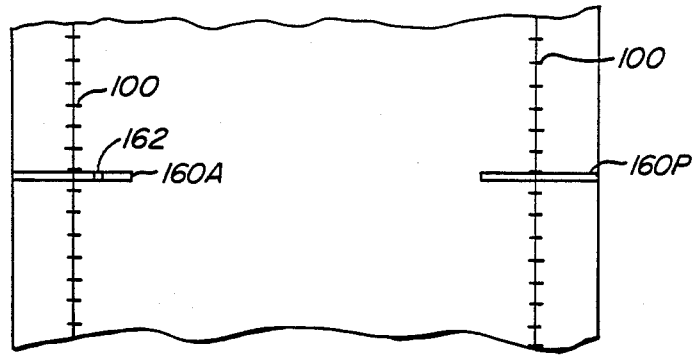
FIG._16A.
FIG._16B. ⌐____⌐⌐____, $P_R$
FIG._16C. ⌐____⌐⌐____, $P_M$
FIG._16.
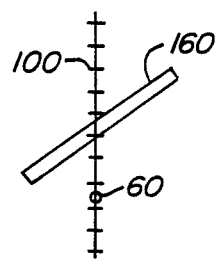
FIG._17.
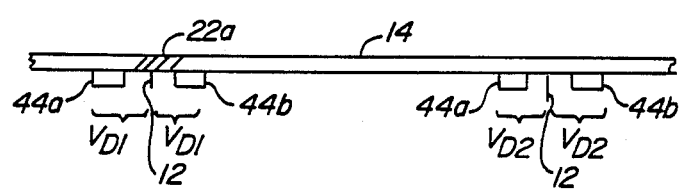
FIG._18.

REGISTRATION SYSTEM FOR AN ELECTROSTIC PRINTER/PLOTTER

This is a continuation of application Ser. No. 794,870, filed Nov. 4, 1985, now abandoned.

BACKGROUND OF THE INVENTION

A color image formed on a piece of paper or other electrographic media by an electrostatic plotter consists of a matrix of dots of selected primary colors. The dots are arranged in vertical image lines or "rasters lines" which combine to form an image. The spacing between dots is dy and the spacing between lines is L.

The color image is a composite image formed by superimposing primary images of the selected primary colors. The primary images must be precisely registered so that the colored dots in each primary image are located in the proper position of the composite image.

Each primary image is formed by affixing dots of colored toner to a piece of paper. The affixation of a dot includes the steps of forming electrostatically-charged dots on the paper, applying toner to the paper, and removing the excess toner. The attraction between the toner and the electrostatic dot causes colored particles in the toner to adhere to the paper. The toner also neutralizes the electrostatic dot, so that the dot will not attract toner of a different color during the formation of other primary images.

Accordingly, the image is formed by positioning electrostatic dots in selected locations. These electrostatic dots are formed by wire styli imbedded in a plotter head in an elongate arrangement. One entire image line of a primary image is formed at a time. The positions of the styli correspond to the positions of the dots in a line of primary image. Those styli in positions where a colored dot is desired are activated by impressing a voltage differential between the desired styli and a backplane positioned near the styli. This voltage causes charge to be stored on a dot of the paper near the vicinity of the styli. The particular styli activated are selected by a write controller.

To form an entire image, the paper and plotter head are placed in relative motion. Typically, either the paper is moved relative to the plotter head or the head is moved relative to the paper. For the moving paper case, a line of the image is formed at time intervals $dt_x$. The time interval $dt_x$ and paper speed are selected so the distance between lines is L.

The composite color image is produced by forming the corresponding primary images in sequence. These primary images may be formed by a multi-pass system where the same piece of paper is passed through a print station to form a first primary image, rewound, passed through the print station to form a second primary image, rewound, and so on.

Alternatively, a single-pass multi-stationed color printer, as described in a commonly-assigned U.S. patent application, Ser. No. 06/722,497 (Kamas et al.), may be utilized to form the primary images.

A major problem associated with either type of printer is maintaining precise registration of each successively-formed primary image relative to the previously formed image on the paper. Changes in humidity cause the paper to change size and mechanical stress causes the paper to elongate. The dots formed in each primary image must be precisely positioned relative to the dots of the other primary image to form a high resolution composite image.

In systems having fixed heads and moving paper, mechanical paper-guiding systems have been developed to minimize paper wandering and stretching. In systems having movable heads, mechanical servo systems for positioning the head to compensate for paper wandering and stretching have been developed.

These mechanical compensation systems are bulky, expensive, and of limited accuracy.

SUMMARY OF THE INVENTION

The present invention is a system for registering superimposed primary images to form a composite color image of high resolution. The system receives virtual image data from a data source, e.g., a color controller, with the virtual image data utilized to form image lines including NW dot positions.

According to one aspect of the invention, the print heads include NP styli where NP is greater than NW. An active region of NA styli is utilized to print the image lines of a primary image. Left and right slack regions of unused styli are positioned at each margin of the active region. If the paper shifts or stretches in the lateral direction, then the first margins of the image lines of the primary images are laterally registered by shifting the positions of the active regions at the print heads.

According to a further aspect of the invention, if the paper changes size in the lateral direction, then the magnitude of NA is adjusted to increase the size of the active region. The second margins of the image lines are registered by adjusting NA so that the image lines of the first and second primary images are of the same length.

According to a further aspect of the invention, the size of the active region is adjusted by adding NADD styli to the active region where NADD +NW is equal to NA.

According to a further aspect of the invention, the NADD added styli are positioned randomly within windows centered at first order styli positions evenly distributed across the active region to prevent the formation of artifacts in the composite image.

According to a further aspect of the invention, a determination of whether a particular added stylus is to be activated during the printing of a particular image line is made. The added stylus is not activated if spacing between dots in the virtual image would be eliminated.

According to a further aspect of the invention, all image lines are enhanced to a minimum thickness and spacing between lines is preserved.

According to a further aspect of the invention, the position of the first margin of an image line is determined by detecting a first registration line formed on the medium at a marker station. In one embodiment, the registration line is a visible line formed on the medium and the detector is a charge-coupled device. The charge-coupled device is positioned at a print head and detects the position of the first registration line relative to the print head. In an alternative embodiment, the first registration line is formed by electrostatic charge deposited on the medium. This electrostatic charge is detected by styli in the slack regions of a print head.

According to another aspect of the invention, the image lines of a first and second primary image are registered in the longitudinal direction to compensate for change of medium size in the longitudinal direction. The position of the first image line in the first primary image is sensed and the first image line of the second primary image is registered thereto. The longitudinal spacing of the image lines in the second primary image is adjusted to compensate for an increase in paper size in the longitudinal direction and to longitudinally register the image lines of the first and second primary images.

According to a further aspect of the invention, a longitudinal transfer system advances the print medium in microstep increments in response to microstep pulses generated at a selected rate by a motor controller. A set of fiducial marks, separated by a distance of a fixed number of microsteps, is formed on the print medium. Successive fiducial marks are detected at the second print head and the number of microstep pulses generated between detection of successive fiducial marks is counted. This counted number is compared to the fixed number to determine the magnitude of longitudinal change in the size of the medium.

According to a further aspect of the invention, an adjustment value, being the difference between the fixed and counted number of microstep pulses, is determined. This adjustment value is utilized to determine an interval value. The spacing between the image lines of the second primary image is adjusted by one microstep for image lines separated by the interval to compensate for longitudinal change of medium size and to longitudinally register the image lines of the first and second primary images.

Other advantages and features of the present invention will be apparent in view of the drawings and the following detailed description of the preferred embodiments.

BRIEF DESCRIPTION OF THE DRAWINGS

FIG. 1 is a perspective view of a print station.

FIG. 2 is a schematic diagram illustrating image formation.

FIG. 3 is a block diagram of a print station.

FIG. 4 is a block diagram of a single-pass full color plotter.

FIG. 5 is a schematic diagram illustrating left margin registration.

FIG. 6 is a schematic diagram of a print head.

FIG. 7 is a block diagram of a lateral registration system.

FIG. 8 is a graph depicting a virtual/physical data transform.

FIG. 9 is a circuit diagram of an embodiment of the write controller.

FIG. 10 is a schematic diagram illustrating right margin registration.

FIGS. 11A–11C are schematic diagrams illustrating added styli placement.

FIG. 12 is a schematic diagram of a longitudinal registration system.

FIGS. 13 and 14 are schematic diagrams illustrating longitudinal registration.

FIG. 15 is a schematic diagram illustrating dithering.

FIGS. 16–18 are schematic diagrams depicting embodiments of sensor systems.

DETAILED DESCRIPTION OF THE PREFERRED EMBODIMENTS

The present invention is a system for precisely registering successively-formed primary images formed by an electrostatic printing presses. These images are formed on an electrographic medium such as, for example, paper.

Referring to FIG. 1, a perspective view of a print station 9 is presented. In FIG. 1, a print head 10 includes a set of equally-spaced styli 12 disposed in an elongate array. A sheet 14 of a print medium, e.g., paper, is disposed below the print head and is transported beneath the print head in the X direction (longitudinal direction). The elongate array of styli 12 is oriented in the Y direction (lateral direction). A toning station 16 is disposed beneath the paper 14 and displaced in the X direction from the print head 10. The toning station 16 includes means for flowing a toning fluid onto the paper 14. The paper is dried after the toning step. The print head and toner in combination form a monochromatic primary image 18 of a selected primary color.

The formation of a primary image on the paper 14 will now be described in more detail with reference to FIG. 2. In FIG. 2, two image lines 20A and 20B of the image 18 are depicted. The second image line 20B is disposed above the print head 10 and is being formed by the styli 12. The styli 12, when activated, form negatively-charged electrostatic dots 22A and 22B on the paper 14. Each line 20 of the image 18 is formed by a single scan of the styli 12.

The paper 14 is transported beneath the print head 10 in the longitudinal direction at a near constant rate. The time between scans is set so that the distance, L, between image lines in the image is equal to the distance, dy, between the dots in a particular line 20 of the image, i.e., dy is equal to L.

The electrostatic dots 22A are not visible. However, as the dots pass over the toner station 16 toning fluid is flowed onto the paper 14. This toning fluid contains a liquid medium and positively-charged colored pigment. The colored pigment adheres to the paper 14 at the negatively-charged dots 22 and neutralizes the dots. Thus, a rectangular array of colored dots is formed which produces the desired image.

Colored areas of the image are formed where negatively-charged dots 22 were printed by the activated styli 12 and white areas of the image are formed in those areas where styli 12 were not activated. As depicted in FIG. 2, each line 20 of the image includes NW dot positions or styli positions $S_i$. The absence of a negatively-charge dot 22 formed by an activated styli 12 results in a white dot in the final image. Accordingly, colored or positive image dots result from a negatively-charged electrostatic dot formed by a stylus and white or negative dots result from the absence of a negatively-charged electrostatic dot. The image 18 includes NL lines of dots.

FIG. 3 illustrates, in greater detail, an embodiment of a print station 9 utilized in the present invention. In FIG. 3 data and command information is supplied from a source of data, e.g., a color controller, to an I/0 controller 30 which functions as an intelligent buffer for the information to be printed. A system controller 32, motor controller 34, and write controller 36 are connected by a command/control data path 38. Write controller 36 is coupled to a head driver 40 by the data path 38. Head driver 40 is coupled to the print head 10. In addition to the elongate array of styli 12, the print head also includes first and second back planes 44A and 44B. A supply roller 46, drive roller and pinch roller 48, and optional take-up roller 50 form a transport path 51 for the medium 14.

A microstep motor 52 has its control input 52C coupled to the control output 34C of the motor controller 34.

Marking stations 54A and 54B are coupled to the write controller 36 by control line 56. Sensors 58A and 58B are coupled to system controller 32 by sense lines 60A and 60B.

The operation of the system depicted in FIG. 3 will now be described. Status information relative to the operation of the print station is generated by the write controller 36 and communicated to the input controller 30 via the command/control data path 38, and made available for transmission to a data source, e.g., a color controller (not shown), by the I/0 controller 30.

The motor controller 34 provides timed microstep pulses to the microstep motor 52. The microstep motor 52 advances a fixed distance, a microstep, upon the receipt of each microstep pulse. The microstep motor 52 causes the paper 14 to advance by on microstep via the driver roller and pinch roller system 48 in response to the micropulse. Although the paper 14 is advanced in microstep increments, the motion of the paper is substantially continuous within the context of the printing process.

The write controller 36 receives the micropulses generated by the motor controller 34 via the data path 38 and counts the microstep pulses. The write controller 36 issues a write signal at upon counting a set number of microstep pulses (a step). This write signal causes the head driver 40 to initiate a printing scan to form a line of a primary image.

The number of microstep pulses in the step between write signals determines the spacing between the lines of the image. Because the timing between write signals and the transport rate of the paper is synchronized to the micropulses, the distance between lines is determined by the number of micropulses in the steps between write signals.

FIG. 4 is a schematic diagram of a single pass electrostatic color printer. The paper 14 is advanced in the X direction by the transport path 51. Each print station 9A, 9B, 9C, and 9D prints a primary monochromatic image of a selected color. A full colored image may be created by superimposing primary images of the colors yellow, cyan, and magenta. Colors in the visual spectrum are created by combining dots of these primary colors in a region of the image. The dots may be directly superimposed, e.g., the super imposition of magenta and yellow produces a red dot, may be disposed side-by-side, or may be disposed in a combination of overlap and side-by-side registration. It has been found however that a true black cannot be produced by superimposition of the three primary colors and therefore an independent black print station 9D is included.

The raster data required to form a given color image is supplied to the plotter system from a color controller (not shown). A system for supplying this raster data is disclosed in a commonly assigned U.S. patent application entitled Color Plotter Controller by Deering et al. filed Nov. 4, 1985. This data is received through the I/0 controller 30 and directed to the write controller 36. The color controller 30 breaks a color image into its primary components. The raster data for each primary image is utilized by the write controller 36 to generate physical data for controlling the activation of the styli 12 at the print stations 13B through 13E. The raster data supplied from the color controller consists of virtual data elements that represent a virtual image. This virtual data is transformed in the write controller 36 to physical data which is utilized by the head driver 40 to control the activation of individual styli 12 in the various print heads.

The physical color image formed by the printer/plotter system is a superimposition of four primary images where the first primary image is a monochromatic yellow and white image, the second primary image is a monochromatic cyan and white image, the third primary image is a monochromatic magenta and white image, and the fourth primary image is a monochromatic black and white image. As described above, the resulting colors in the composite image are determined by the superimposon and close registration of the various primary-colored dots. The primary images formed at each of the print heads 9A through 9D must be precisely registered to cause this superimposition and lateral registration to accurately reproduce the colors of the virtual image and to provide a high resolution image on the paper.

From FIG. 4, it is apparent that the four primary images of the final composite image are formed sequentially in time. The yellow monochromatic primary image is formed first as the paper passes below the yellow print station 9A. The yellow primary image is passed below the cyan print station 9B where the cyan primary image is superimposed on the first primary image. Next, the magenta primary image is superimposed on the composite yellow and cyan primary images at the magenta print station 9C. Finally, the black primary image is superimposed upon the combined yellow, cyan, and magenta primary images to form the composite full-color image at the black print station 9D.

The position of the print heads 9A through 9D relative to the paper transport system 51 is mechanically fixed. However, the paper may shift in the lateral direction, stretch in the longitudinal direction, and change in size (expand or contract) as a given area of the paper is transported from one print station to another. The expansion or contraction of the paper is due primarily to humidity differences to which it is subjected when rolled and unrolled.

Thus, even if the print heads 10 are mechanically aligned and spaced relative to the transport path 51, the primary images printed may not be registered due to lateral shift, longitudinal stretch, and change of size of the paper. The present system provides for accurate, longitudinal, and lateral registration of the primary images formed at each print station to provide a high resolution composite color image.

The operation of the invention will first be described for the case of registering a second primary image to a first primary image previously formed on the paper. Without loss of generality, the case where the first primary image is formed by a first printing station 9A and the second primary image is formed by a second printing station 9B will be described.

The lateral registration system of the present invention will be described first. FIG. 5 illustrates a first aspect of the lateral registration problem. Referring to FIG. 5, line 20A is the first line of the primary image and line 20B is the first line of the secondary images. These lines are shown longitudinally displaced to simplify the description of the lateral registration problem. In actuality, the line should be superimposed. In FIG. 5, the left margin 20BL of the first line printed in the second primary image is displaced from the left margin 20AL of the first line in the first primary image by a distance DY. This displacement may be due to lateral paper shift in the transport path 51.

FIG. 6 depicts the stylus configuration of the print head utilized in the present invention. For ease of description, the styli 12 are shown disposed in a linear equi-spaced array. In a preferred embodiment, a bi-scan print head having two rows of styli 12 positioned in a staggered arrangement is utilized. These print heads are fully-described in U.S. Pat. Nos. 3,622,396; 3,653,065; 3,611,419; 3,657,005; and 3,342,164 which are hereby incorporated by reference. The function of the present system will be described with reference to the simpler arrangement depicted in FIG. 6. The extension of these concepts to a bi-scan head as described in the above-referenced patents or a quadrascan head as described in U.S. Pat. Nos. 4,419,679 and 4,417,391, by Rutherford et al., which are hereby incorporated by reference, will be apparent to persons of skill in the art.

Referring now to FIG. 6, a total of NP styli 14 are included in the array. Each raster line in the virtual image includes NW virtual data elements. These virtual data elements are transformed into physical data elements at the write controller 36. The physical data elements are utilized to control the states of NW styli to form the lines of the primary image. Each stylus position is labeled by the index, i where $S_i$ is the position of the ith stylus in the stylus array. The physical data field includes NP physical data elements with the jth physical data element determining whether the stylus at position $s_i$, $i = j$, is activated during a given scan. The write controller 36 transforms the NW virtual data elements of a given raster line into NW physical data elements corresponding to an active region of NA styli. In this example, NA =NW. The first stylus in the active region is at position $S_A$. The write controller 36 maps the first data element, $V_1$, of the virtual raster line into the Ath physical data element, $P_A$. The unused styli at each side of the active region form left and right slack regions.

FIG. 7 depicts the system utilized for determining the value of the quantity A needed to maintain registration between the left margins of the image lines of the first primary image and the second primary image. In FIG. 7, the first primary image printing station 9A and second primary image printing station 9B are depicted. The left registration marking system 54A produces a left registration line 60 on the paper 14. The position of the left registration marker station 54A is fixed relative to the styli positions in the printer heads 10 at the first and second print stations 9A and 9B.

In fact, in the present embodiment, the marker station utilizes styli in the slack regions of the first print head 10A and special toning stations positioned outside the image 18 to form the registration lines. The active region of the first print head 10A forms image lines of the first primary image which are toned yellow and selected styli in the blask regions form the registration lines which are toned black. Alternatively, the registration lines could be toned yellow and filters utilized at the sensors to detect the registration lines. Since the stylus positions, $S_i$, utilized to generate the registration line 60 is known, the position of the registration line 60 at the first print head 10A is known.

Sensor 58 at the second printing station 9B measures the position of the registration line 60 relative to the stylus positions at the first printing head 10B. The write controller 36 receives the stylus position $S_i$ corresponding to the position of the registration line measured at each head. The write controller 36 then adds a fixed stylus increment, $S_1$, to the stylus location of the registration line 60 to determine the position of the first stylus in the active region, $S_A$. The distance of the first stylus, $S_{A1}$, of the active region in the first print head 9A from the registration line 60 is D1. The distance of the second stylus, $SA_2$, in the second print head 9B from the registration line 60 is D2.

In operation, a preliminary length of the registration line 60 is generated prior to formation of the primary images. The position of the registration lines at print stations 9A and 9B is measured and preliminary values of the first stylus position of the active region, $S_{A1}$ and $S_{A2}$, are then determined so that the left margins of the active regions at the two print stations are laterally registered and D1 is equal to D2.

During printing D2 is periodically measured to determine any change in magnitude due to lateral paper shift or change in size of the paper. If the magnitude of D2 has changed, then the quantity A2 is updated by the write controller 36 so that the magnitude of the distance from the registration line 60 to the left margins of the corresponding lines in the first and second primary image are equal. Thus, the left margins of the first and second primary images are maintained in precise lateral registration.

FIG. 8 illustrates the virtual/physical data transformation. In FIG. 8, the virtual data elements $V_0$ through $V_{NW}$ are mapped into the physical data elements $P_A$ through $P_{A+NW}$. In the present embodiment, if $P_i$ is equal to one, then the stylus at position $S_i$ is activated during a scan and, if $P_i$ is equal to zero, the stylus is not activated. In the transformation illustrated, all $P_i$ for i less than A and i greater than A+NW are set to zero. These $P_i$s define left and right slack regions, $S_1$ through $S_{A-1}$ and $S_{A+NW+1}$ through $S_{NP}$ in the stylus array. The active region of the stylus array includes the stylus positions $S_A$ through $S_{A+NW}$. The position of the active region of the stylus array is varied by adjusting the value of the quantity A.

A block diagram depicting circuitry in the write controller 36 for implementing lateral registration correction and line enhancement is depicted in FIG. 9.

Referring now to FIG. 9, the data path 38 is coupled to input buffer 70. Input buffer 70 is coupled to a parallel to serial virtual data shift register 72 by bus 74. The virtual data shift register 72 is coupled to a serial to parallel physical data shift register 76 by serial bus 78. The physical data shift register 76 is coupled to output buffer 80 by data path 82.

Each shift register 72 and 76 includes parallel and serial clock inputs. A transform unit 84 includes CLK, OFFSET, and INCREMENT inputs and CLK 1 and CLK 2 outputs. The CLK input is coupled to a system clock input 86, the OFFSET input is coupled to the output of an OFFSET counter 88, and the INCREMENT input is coupled to the output of an INCREMENT counter 90.

Both the INCREMENT and OFFSET counters 88 and 90 include counting inputs 88c and 90c coupled to the CLK terminal 86 and data inputs 88d and 90d for receiving initial counter values from the system controller 32.

The serial clock input port of the virtual data SR72 is coupled to the CLK 1 output and the serial clock input of the physical data SR 76 is coupled to the CLK 2 output.

An input counter 92 has a counter input coupled to the CLK 1 output and an output port coupled to the parallel clock input of the virtual data SR 72. An output counter 94 has a counter input coupled to the CLK 2 output and an output coupled to the parallel clock input of the physical data SR 76.

The output register 80 output ports are coupled to the input ports of a delayed line buffer memory 96 and a vertical line enhancement and marker data generating unit 97. The unit 97 includes inputs coupled to the outputs of a marker data generator 98a, a line counter 98b, and a byte counter 98c. The outputs of line and byte counters 98b and 98c are also coupled to the inputs of memory 96.

The operation of the circuit depicted in FIG. 9 will now be described. The virtual data is loaded into the virtual data shift register 70 so that the data element $V_1$ is shifted onto the serial bus 78 first and the data element $V_{NW}$ is shifted last.

The system controller 32 presets the initial counter value of the OFFSET counter 88 to a value determined by the value of A required to register the left margins of the lines of the first and second primary images. Both the CLK 1 and CLK 2 output signals are derived from the system CLK signal. The INCREMENT counter output is utilized by transformation unit 84 to inhibit the CLK 1 signal for (A−1) counts while the CLK 2 signal causes (A−1) zeros to be shifted into the physical data SR 76. Accordingly, the physical data elements $P_0$ through $P_{A-1}$ are set equal to zero. The CLK 1 and CLK 2 signals are then clocked together for NW counts to map the virtual data elements $V_1$ through $V_{NW}$ into the physical data elements $P_A$ through $P_{A+NW}$. Finally, the CLK 1 signal is again inhibited for (NP−A−NW) counts while the CLK 2 signal causes zeros to be shifted into the physical data SR 76 to set the physical data elements $P_{A+NW}$ through $P_{NP}$ equal to zero.

The input counters 92 and output counter 94 monitor the CLK 1 and CLK 2 signals, respectively, and provide signals to cause a parallel data shift into SR 72 and out of SR 76 at the appropriate times.

A detailed circuit diagram corresponding to the block diagram of FIG. 9 is set forth in an Appendix.

The second aspect of lateral registration problem relates to aligning the right margins of the lines of the first and second primary images. If the left margins of the lines are aligned then misalignment of the right margins is due to change of paper size between the time that a given line in the first primary image is printed and the time that the corresponding line in the second primary image is printed.

FIG. 10 illustrates the case where the paper has increased in size between the time that the lines in the first primary image were printed and the time that the line in the second primary image is to be printed.

Referring to FIG. 10, the first primary image line 20A has increased in size from L1 to L2 due to paper stretch. The left margin of the first primary line 20A and of the active region of the printer head have been aligned as previously described. However, the length of the active region of the second plotter head is L1. Thus, if a second image line were to be printed, the second image line would be shorter than the first image line and would not be laterally registered at the right margin. This lack of registration results in poor resolution and poor color reproduction. Accordingly, the present system adds styli to the active region where the number of styli added is equal to NADD. The number NADD is selected so that NADD is multiplied by the distance between styli is equal to the difference between the length of the first line at the second plotter head and the length of the active region, i.e., L2−L1.

In the present embodiment, the quantity NA is increased from NW by adding styli to the active region. If the paper decreases in size from the first print station 9A to the second print station 9B then image lines 20b in the second primary image having NW dot position (length L1) would be longer than the image lines 20a of the first primary image. Thus, the NA adjustment must be made at the first print station 9A because the NA of the active region cannot be less than NW. A preliminary length of the first and second registration lines is sensed at the second print station 9B, the distance between the registration lines, DR1 and DR2, is determined, and the magnitude of the number of styli (NADD) that must be added to the active region at the first print head 10A is determined. The decrease in paper size between the print stations cause the NW +NADD dot position image line 20a of the first primary image to be the same length as the NW dot position image line 20b of the second primary image.

The total number of styli in the newly-defined active region NA is equal to NW added to NADD. Since only NW virtual data elements are supplied to the write controller 36, the physical data elements to determine whether the added styli are activated during a particular line scan must be generated by the write controller 36. Specific algorithms for determining the value of these added physical data elements are described below.

However, a first problem is the placement of the added styli. FIG. 11A illustrates the problem of placing the added styli. In FIG. 11A the original active region including the NW physical data elements corresponding to the virtual data elements and the additional NADD styli required for right margin registration are shown in a side by side relationship. Since the NADD styli at the right margin are not included in the image, the right margin correction would be an arbitrary pattern of dots unrelated to the image if the styli were maintained in this relationship. An example of placement of the styli to avoid this problem is depicted in FIG. 11B. First, the added styli are evenly distributed throughout the NW stylus positions representing the virtual image. Secondly, the position of the added styli are randomized in a small interval, e.g., ±8 styli, around the first order evenly distributed positions.

The need for randomization is especially critical in complex multi-colored regions of an image. If a given added stylus always had the same stylus position, then a line or artifact in the complex region of the image would be created. By randomizing the position of the added styli the effects of adding a dot.

The system for inserting the extra styli will now be described with reference to FIG. 9 and FIG. 11C. Referring to FIG. 11C a section of the virtual/physical data transformation is depicted. As described with reference to FIG. 9, this transformation is achieved utilizing SRs 72 and 76 and the CLK 1 and CLK 2 signals. A physical data element is to be added at position ($P_{j+1}$) as determined by the system controller 32.

From FIG. 11C, $V_i$ is mapped into $P_j$ and $V_{i+1}$ into $P_{j+1}$. The CLK 1 is signal is then inhibited for one count so that $V_{i+2}$ is not shifted from SR 72 to SR 76. The value of is determined by the write controller as described below. The clocking of CLK 1 signal is again resumed and $V_{i+2}$ is mapped into $P_{j+3}$.

Referring to FIG. 9, the timing of the inhibition of the CLK 1 signal to add physical data elements is controlled by the INCREMENT counter 90 output.

One method for randomizing the positions of the added styli is as follows. The first order evenly distributed added styli positions are specified by a 16-bit binary number. The least significant three or four bits of this number are then replaced by the output of a random number generator.

The system for longitudinally registering the first and second primary images will now be described. Referring to FIG. 12, a series of equally-spaced fiducial marks 100 is placed on the paper by the marking station 54A at the first print station 9A. These marks are detected by the sensors 58 at succeeding print stations 9 and the time of detection is transferred to the system controller 32. The system controller 32 generates a first write signal when a selected one of a preliminary series of marks 100 is printed at the first print station. Succeeding lines of the first primary image are printed at steps of 16 microsteps, each of length dx, where the distance between steps is equal to 16dx. In the present context, a step is the distance on the paper between image lines and also represents the number of micropulses corresponding to the number of microsteps between image lines.

FIG. 13 illustrates how paper stretch can cause loss of longitudinal registration between the first and second primary images. In FIG. 13, the paper has stretched so that the distance between lines of the primary image at the second print head is equal to $(16 + \Delta)dx$. The write controller 36 generates the first write signal when the selected fiducial mark 100 is detected at the second print head. However, if succeeding second image lines are printed at steps of 16 micropulses, then the distance between lines in the second image will be 16dx. Thus, a longitudinal registration error of $\Delta dx$ will be introduced at every step.

In a typical example, the distance between fiducial marks 100 at the first printer head is 1600 microsteps, 100 lines are printed between each fiducial mark, and the distance or step between lines is 16 microsteps.

In the system of the present invention, the system controller counts the microstep pulses between the fiducial marks detected at the second print station 9B to determine the quantity CN. If the paper has stretched then CN will be greater than 1600. The difference between CN and 1600 is equal to the adjustment, ADJ, needed to correct for the longitudinal registration error. Typically, the value of ADJ is less than 100, so that $\Delta$, the adjustment required at each step, is less than one. The write signal is synchronized to the microstep pulses and the minimum correction that can be implemented is one microstep.

An example of this correction process will now be described with reference to FIGS. 14A and 14B. FIG. 14A depicts the case where the size of the paper has not changed between the first and second print heads 9C and 9D. The number of microsteps, CN, counted between fiducial marks 100 is 1,600 and the value of ADJ is zero. Thus, the number of microsteps between lines, i.e., the magnitude of each step, is 16 and no longitudinal correction is implemented.

In FIG. 14B the paper has increased in size in the longitudinal direction. The value of CN is 1,610 and ADJ is 10. Thus the error, $\Delta$, at each step between the fiducial marks 100 is 1/10 of a microstep. As described above, the write signal timing is determined by counting microstep pulses. Thus, the minimum correction to the length of a step is one microstep.

FIG. 14B illustrates the distribution of the adjustment over the set of lines 20$b$ of the second primary image. A one microstep correction is made at intervals of ten steps. Thus, the 1st, 11th, 21st, ..., 91st steps are seventeen microsteps long and all other steps are 16 microsteps.

The system controller 32 determines the value of CN and ADJ and generates a table of the number of microstep pulses to be counted between each write signal. The resulting timing of the write signals assure longitudinal registration between the image lines of the first and second primary images.

If the paper decreases in size between the first and second print stations 9A and 9B, then CN at the first station 9A is greater than CN at the second print station 9B. The value of ADV in that case is a negative number. The correction of the spacing between image lines of the second primary image is implemented by decreasing the size of the steps, separated by the interval value, by one microstep.

The amount of longitudinal shrinkage is determined by counting the microstep pulses between the generation of successive marks 100 at the first print station 9A and the detection of successive marks at the second print station 9B.

A line enhancement function is utilized to select the value of the physical data elements added to implement right margin lateral registration and to improve image quality.

The line enhancement function includes two types of line enhancement algorithms. The first type will preserve dotting patterns, e.g. (01010101) and the second type fills a dotting pattern to all ones, e.g., (01010101) to (1111111).

The use of these line enhancement algorithms to improve image quality will first be described. Two horizontal lines in an image may be represented by the virtual data elements 00100100. Generally, a line one-dot thick is not desired. The system controller would implement the first type enhancement algorithm to generate the physical data elements 011001100. Thus, the line width is increased to two dots. The second type of enhancement algorithm is utilized to prevent drop-outs when filling an image region with colored dots.

These line enhancement algorithms may be utilized independently of the stylus addition function.

The use of the second type of enhancement algorithm to determine the value the added physical data element for an image including two horizontal lines will now be described.

Assume that the physical data elements representing the two lines, before insertion of the added physical data element, is 01010. Let Z be the added pixel element whose value is to be determined. If Z is placed so that the physical data elements are 010Z1then Z is set to zero. If Z is placed so that the physical data elements are 0101Z0 then Z is set to zero.

The determination of the value of the added pixel in complex colored regions of an image is determined by a dithering technique.

Table 1 illustrates the outcome of the first and second types of algorithms applied to a bit Z added to an arbitrary virtual data set.

TABLE 1

| Data Set | Value of Z (Type 1) | Value of Z (Type 2) |
|---|---|---|
| 00Z0 | 0 | 0 |
| 00Z1 | 1 | 1 |
| 01Z0 | 1 | 1 |
| 01Z1 | 1 | 1 |
| 10Z0 | 0 | 0 |
| 10Z1 | 0 | 1 |
| 11Z0 | 0 | 0 |
| 11Z1 | 1 | 1 |

For example, FIG. 15A depicts a dot array for forming a pale red region in a composite color image. FIG. 15B depicts the image with an added pixel, Z, in the first line. The use of white dots, W, to form a pale color is an example of a half-tone technique.

The pixel Z is added at the second toner statin 9A. Thus, if the physical data element corresponding to Z is one then a magenta dot will be printed. If the physical data element is 0 then a white dot will be printed. Printing either a white or magenta dot a Z will introduce a color error $E_c$ into the pale red region.

The dithering algorithm in the system control adjusts the color values of surrounding dots to compensate for $E_c$. The above-described randomizing is especially useful in half-toned or dithered regions to prevent randomizing. For an image comprising lines, randomizing is not used, the placement and activation of the added styli is controlled by the line enhancement function.

The sensing system 54 utilized in the present embodiment will be described with reference to FIGS. 16A-C. FIG. 16A depicts an optical CCD sensor 160A positioned to receive light reflected from the paper medium 14. The CCD detector comprises a shift register of optical integration cells 162.

During an exposure cycle, light incident on each cell 162 releases electrons which are stored at each cell. The charge stored at each cell indicates the intensity of the light incident in the cell 162 during the exposure cycle. The charge stored in each cell 162 is sequentially measured during a read cycle.

FIG. 16B indicates the form of the read output when the registration line 60 is positioned below the CCD 160. The amount of charge stored in the cells 162 disposed above the registration line is less than in cells 162 disposed over the white region of the paper 14 because the black line does not reflect much light.

A low pulse, $P_R$, indicates the position of the registration line. The position of $P_R$ is determined by counting the cells 160 as they are serially read.

The fiducial marks 100 generate a wide pulse, $P_F$ (FIG. 16C). The number of microstep pulses between successive $P_F$s is utilized to determine the ADJ value.

A second sensor 100B measures the position of the second registration line 60B. The distance between registration lines is utilized to determine NADD.

The difference between the positions of the $P_R$ pulse for successive readouts is compared to a threshold $T_R$. The value of A is updated if this difference is greater than $T_R$.

FIG. 17 depicts an alternate sensing arrangement. In FIG. 17 the CCD sensor 160 is oriented at an angle, e.g., 45°, relative to the registration line 60. This orientation allows two fiducial marks 60 to be detected at one time. The distance between fiducial marks 60 may be determined utilizing one readout cycle.

FIG. 18 depicts an alternate detection scheme that utilizes styli in the slack region of the second print station 13D as sensors.

Referring to FIG. 18, an electrostatic dot is formed at a selected stylus, $S_E$, at the first print station 13D. This dot is not toned and, therefore, is not neutralized.

At the second print head 13D a potential, $V_{D2}$, is maintained between the styli in the slack region and the backplane. When the charged dot, formed at the first print station 13C, passes over a stylus at the second print head 13D $V_{D2}$ at that stylus will change in magnitude to the presence of the charged dot. This change in $V_{D2}$ is detected and the stylus location of the dot at the second print head is determined.

A system for registering the primary images of a composite color image that does not require mechanical repositioning of the medium or print heads has now been described with reference to preferred embodiments. Various modifications and substitutions of parts will now be apparent to person of ordinary skill in the art.

In particular, other types of print heads may be substituted for those described. Further, other primary colors may be used and the order of colors may be changed. Different systems for randomizing the placement of added styli and distributing the adjustment to the spacing between image lines may be substituted. Additionally, the adjustment to the length of the image lines can be accomplished by decreasing the number of styli in the active region.

Accordingly, it is not intended to limit the breadth and scope of the invention except as provided by the appended claims.

What is claimed is:

1. In an electrostatic plotter system of the type that forms a composite color image by superimposing a second primary image of a second primary color over a first primary image of a first primary color formed on an image medium, where each primary image consists of image lines of dots, where the image lines are printed by a print head, where the image provided to the plotter system from an image source is in the form of virtual image data, with each image line of the virtual image in the from of NW binary data elements, where each primary image is formed by positioning the medium at a first position relative to a print head, printing a first image line on the medium. positioning the medium in a second position relative to the print head, and so on until NL image lines have been printed, a system for registering the second primary image to the first primary image formed at a first print head comprising:

a second print head for forming a second primary image having NP styli, with NP greater than NL, with each styli for forming a dot on said image medium when activated, with the styli disposed in an elongate, substantially equidistant array positional substantially perpendicular to the direction of relative motion between said plotter head and said image medium, with the styli labeled $S_i$, i=1, ..., NP, and with $S_1$ being the stylus on the first end of the print head and with $S_{NP}$ being the stylus on the second end of the print head;

means for defining an active region of NA adjacent styli at said second print head with $S_A$ being a stylus on the first boundary of the active region and $S_{A+NA}$ being the stylus on the second boundary of the active region, with said active region for printing the dots in an image line of said second primary image;

means for forming a first registration mark on said medium with said means for forming having a fixed lateral positon ralative to said print head;

means, at said second print head, for sensing the lateral position of said first registration mark on said medium when said mark is positioned below said print head; and means, coupled to said sensing means and said second print head, for adjusting the value A to position the stylus $S_A$ a selected distance from said sensed first registration mark on the medium.

2. In an electrostatic plotter of the type that superimposes a second primary image over a first primary image, where both primary images are formed of image lines terminated at first and second margins, a system for registering said primary images comprising:

means for determining change of paper size in the longitudinal direction; and means for adjusting the spacing between lines of one of said primary images to compensate for longitudinal change in paper size.

means for determining the position of the first margin of the image lines of one of said primary images; and means for shifting the position-of the first margin of the image lines of the other one of said primary images to register the left margins of the image lines of the first and second primary images.

means for determining the position of the second margin of the image lines of one of said primary images; and means for adjusting the length of the image lines of the other one said primary images, having their first margins registered with the image lines of the other primary image so that the second margins of the image lines of the first and second primary images are registered.

3. In an electrostatic plotter system of the type that forms a composite color image by superimposing a second primary image of a second primary color over a first primary image of a first primary color formed on an image medium, where each primary image consists of image lines of dots, where the image lines are printed by a print head, where the image provided to the plotter system from an image source is in the form of virtual image data, with each image line of the virtual image in the form of NW binary data elements, where each primary image is formed by positioning the medium at a first position relative to a print head, printing a first image line on the medium, positioning the medium in a second position relative to the print head, and so on until NL image lines have been printed, a system for registering the second primary image to the first primary image formed at a first print head comprising:

a second print head for forming a second primary image having NP styli, with NP greater than NL, with each styli for forming a dot on said image medium when activated, with the styli disposed in an elongate, substantially equidistant array positional substantially perpendicular to the direction of relative motion between said plotter head and said image medium, with the styli labeled $S_i$, i = 1, ..., NP, and with $S_1$ being the stylus on the first end of the print head and with $S_{NP}$ being the stylus on the second end of the print head;

means for defining an active region of NA adjacent styli at said second print head with $S_A$ being a stylus on the first boundary of the active region and $S_{A+NA}$ being the stylus on the second boundary of the active region, with said active region for printing the dots in an image line of said second primary image;

means for positioning $S_A$ over the first boundary of the image lines of said first primary image positioned below said second print head; and means for adjusting NA to position $S_{A+NA}$ over the second boundary of the image lines of said first primary image positioned below said second print head, where NA is adjusted by adding NADD styli to the active region.

4. The invention of claim 1 further comprising:

means for forming a second registration mark on said medium with said means for forming said second registration mark having a fixed lateral position relative to said print heads; and means at said second print head for sensing the lateral position of said second mark on said medium when said second mark is positioned below said print head.

5. The invention of claim 4 further comprising:

means for measuring the distance between the first and the second registration marks when a selected image line of said first primary image is formed; and means for measuring the distance between said first and second sensed registration marks when said selected image line of the first primary image is positioned below said second print head to determine the magnitude of lateral paper size change.

6. The invention of claim 5 further comprising:

means for utilizing the determined magnitude of lateral paper size change to adjust NA so that the length of the active region is equal to the length of the selected line of the first primary image positioned below the print head, where NA is greater than NW and where NA−NW is the number of styli that must be added to the active region so that the second primary image is laterally registered to the first primary image.

7. The invention of claim 6 further comprising:

means for positioning said added styli to prevent the creation of artifacts in said composite image.

8. The invention of claim 7 wherein said means for positioning the added styli comprise:

means for generating a set of (NA−NW) first order added styli positions evenly distributed over the active region;

means for positioning an added stylus at a randomly selected position, $S_R$, within ±Y stylus locations from one of said first order added styli positions.

9. The invention of claim 8 for positioning the styli $S_A$ and $S_{A+NA}$ further comprising:

means for receiving and storing NW virtual data elements, $V_k$, k = 1, ..., NW, defining a raster line of said virtual image;

means for generating a set of NP physical data elements, $D_j$, j = 1, ..., NP, with the value of element $D_j$ determining whether stylus $S_i$, i = j, will be activated when printing a physical line corresponding to the virtual line represented by said $V_k$s;

means for setting the value of $D_A$ to correspond to $V_1$ and $D_{A+NA}$ to correspond $V_{NW}$, where NA is equal to NW plus the number of added styli needed to laterally register the lines of the second primary image to the lines of the first primary image; and means for selecting the value of the physical data element $D_R$ which determines whether the added stylus at the added stylus position $S_R$ will be activated and for preventing the creation of artifacts in said composite image.

10. The invention of claim 3 further including a system for positioning said added styli comprising:

means for generating a set of (NA−NW) first order added styli positions evenly distributed over the active region; and means for positioning an added stylus at a randomly selected position, $S_R$, within ±Y stylus locations from one of said first order added styli positions.

11. The invention of claim 10 further including a system for determining whether an added stylus is activated comprising:

means for determining whether styli adjacent to said added stylus are activated; and means for preventing activation of an added stylus if activation would not preserve spacing between dots in the virtual image.

12. A method for ensuring superimposed color component images on a section of recording medium in the production of a sequence of individual color component images to form a multicolor composite image by a color electrographic recording apparatus, with each component image formed by a series of lines of a specified color, and with the recording apparatus of the type having a print head for printing one line of a component image at a time with the print head including an array of styli, characterized by a length disposed perpendicularly to the direction of medium transport through the recording apparatus, where the array includes an active region utilized to form a line of a color component of the composite image and left and right slack regions disposed to the left and right, respectively, of the active region which are not used to form a component line said method comprising the steps of:

forming a tracking indicia on the medium to indicate the lateral position, along the length of the array, of a given line in a specific one of the individual color components in the sequence;

observing said tracking indicia to determine a measure of the lateral displacement, along the length of the array, of said given line relative to the active region;

shifting the position of the active region in the array, in response to said determined measure, to reduce the displacement of said given line relative to the active region of styli.

13. A method for ensuring superimposed color component images on a section of recording medium in the production of a sequence of individual color component images to form a multicolor composite image by a color electrographic recording apparatus, with each component image formed by a series of lines of a specified color, and with the recording apparatus of the type having a print head for printing one line of a component image at a time with the print head including an array of styli, characterized by a length disposed perpendicularly to the direction of medium transport through the recording apparatus, where the array includes an active region utilized to form a line of a color component of the composite image and left and right slack regions disposed to the left and right, respectively, of the active region which are not used to form a component line, said method comprising the steps of:

forming a tracking indicia on the medium to indicate the difference of length due to stretching or shrinking of the medium, between a given line in a specific one of the individual color components in the sequence and the length of the active region;

observing said tracking region to determine a measure of said difference of length; and changing the length of the active region in the rectangular array, in response to said determined measure, to reduce the difference between the length of said given line and the length of the active region of styli.

14. The invention of claim 13 wherein said step of changing the length of the active region comprises the steps of:

adding styli to the active region; and randomly positioning said styli within said active region to prevent the creation of artifacts in the composite image.

* * * * *